US012737749B2

(12) United States Patent
Rapowitz et al.

(10) Patent No.: US 12,737,749 B2
(45) Date of Patent: Sep. 15, 2026

(54) SYSTEMS AND METHODS FOR USE OF A CONTACTLESS PAYMENT TERMINAL DEVICE

(71) Applicant: Capital One Services, LLC, McLean, VA (US)

(72) Inventors: Samuel Rapowitz, Roswell, GA (US); Bryant Yee, Silver Spring, MD (US); Armando Martinez Stone, Richmond, VA (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 436 days.

(21) Appl. No.: 18/177,190

(22) Filed: Mar. 2, 2023

(65) Prior Publication Data

US 2024/0296440 A1 Sep. 5, 2024

(51) Int. Cl.

*G06Q 20/34* (2012.01)
*G06Q 20/20* (2012.01)
*G06Q 20/32* (2012.01)

(52) U.S. Cl.

CPC ......... *G06Q 20/352* (2013.01); *G06Q 20/204* (2013.01); *G06Q 20/3278* (2013.01)

(58) Field of Classification Search

CPC ............... G06Q 20/352; G06Q 20/204; G06Q 20/3278; G07F 7/0873; G07F 7/0893
See application file for complete search history.

(56) References Cited

U.S. PATENT DOCUMENTS 7,299,983 B2 11/2007 Piikivi
8,485,436 B2 * 7/2013 Bedore ................ G06K 7/0008 235/380
8,602,327 B2 * 12/2013 Meslin ............. G06K 19/07703 235/487
8,912,997 B2 * 12/2014 Baldischweiler ....... G07F 19/20 345/102
9,286,607 B2 3/2016 Smets et al.
9,396,368 B1 * 7/2016 Lamba ............. H04W 52/0225
(Continued)

FOREIGN PATENT DOCUMENTS

CA 3131449 A1 * 10/2020 ......... G06K 7/10376
CN 101313329 A * 11/2008
(Continued)

OTHER PUBLICATIONS

International Search Report mailed Jun. 17, 2024 for Application No. PCT/US2024/17642.
(Continued)

*Primary Examiner* — Ashford S Hayles
(74) *Attorney, Agent, or Firm* — TROUTMAN PEPPER LOCKE LLP; Christopher J. Forstner; John A. Morrissett

(57) ABSTRACT

Disclosed embodiments may include a system for improving usability of a contactless payment terminal device. The system may detect a presence of a contactless transaction card. Responsive to determining that the contactless transaction card is not positioned at a desired location relative to a location of a contactless transaction card reader, the system may output a dynamic proximity guide indication. The dynamic proximity guide indication may be configured to provide a dynamically changing indication of how close the contactless transaction card is to being positioned at the desired location.

20 Claims, 9 Drawing Sheets

(56) References Cited

U.S. PATENT DOCUMENTS 10,498,401 B1* 12/2019 Rule ..................... H04N 23/60
10,819,394 B1* 10/2020 Petzel ..................... H04B 5/79
10,862,543 B2* 12/2020 Wurmfeld ............... H02J 50/10
10,885,514 B1* 1/2021 Hart ..................... G06Q 20/353
11,481,750 B2* 10/2022 White .................... G07G 1/009
11,568,382 B1* 1/2023 Chiu .................... G06Q 20/353
11,663,583 B2* 5/2023 Hart ..................... G06Q 20/353 705/41
11,871,237 B1* 1/2024 Han ..................... H04B 17/318
12,003,285 B2* 6/2024 Rule ....................... G06T 7/246
2003/0229793 A1* 12/2003 McCall .................... G07C 9/23 235/383
2004/0058705 A1* 3/2004 Morgan ............... G06Q 20/341 455/90.3
2007/0051800 A1* 3/2007 Muto .................. G07G 1/0054 235/383
2008/0179403 A1* 7/2008 Endlebardt .......... G06Q 20/327 235/492
2011/0313922 A1* 12/2011 Ben Ayed .............. H04W 4/80 705/42
2012/0241524 A1* 9/2012 Blot .................. G06K 7/10128 235/492
2013/0084801 A1* 4/2013 Royston ................. G06K 7/015 455/41.1
2014/0139347 A1* 5/2014 Forster ..................... H04K 3/86 340/10.6
2015/0017914 A1 1/2015 Dua
2015/0161601 A1* 6/2015 Matsumoto .......... G06Q 20/353 705/17
2015/0242663 A1 8/2015 Babu et al.
2015/0262162 A1* 9/2015 Akashika ........... G06Q 20/3272 705/42
2015/0288931 A1* 10/2015 Smith ................ G06Q 30/0643 348/150
2016/0117659 A1* 4/2016 Bedier ................. G06Q 20/047 705/16
2016/0247057 A1* 8/2016 Lee .................... G06Q 20/3227
2017/0004475 A1 1/2017 White
2017/0148007 A1* 5/2017 Coquelet ............. G06Q 20/204
2017/0178103 A1* 6/2017 Peri .......................... G07G 3/00
2017/0330237 A1 11/2017 Canceri
2018/0293410 A1* 10/2018 Suzuki ................. G06K 13/085
2018/0322484 A1* 11/2018 Park .................. G06Q 20/1085
2018/0352377 A1* 12/2018 Schwarzer ............... H04B 5/24
2019/0094452 A1* 3/2019 Norrie ................... F21V 23/003
2019/0147310 A1* 5/2019 Allirot ............... G06K 7/10316 235/492
2019/0370805 A1* 12/2019 Van Os ................. H04W 12/06
2021/0073790 A1* 3/2021 Hart ..................... G06Q 20/353
2021/0158332 A1* 5/2021 Adari .................. G06Q 20/352
2021/0201288 A1 7/2021 van Os
2021/0216997 A1 7/2021 Maragoudakis
2022/0129881 A1* 4/2022 DeFazio .............. G06Q 20/202
2022/0391867 A1* 12/2022 Glaser ..................... G06F 3/017
2022/0398563 A1* 12/2022 DeFazio ............ G06Q 20/3278
2023/0237465 A1* 7/2023 Hart ..................... G06Q 20/353 705/41
2024/0112171 A1* 4/2024 Kim ..................... G06Q 20/352
2024/0273505 A1* 8/2024 Reveron Medina ......................... G06Q 20/204

FOREIGN PATENT DOCUMENTS

CN 107004146 A * 8/2017 ........... G06Q 20/047
EP 3057047 A1 * 8/2016 ............. G06Q 20/36
EP 3154014 A1 4/2017
JP 2008046948 A * 2/2008
JP 2015114788 A * 6/2015
JP 2015114789 A * 6/2015
WO WO-2019114403 A1 * 6/2019 ............... G06K 7/10
WO WO-2021099108 A1 * 5/2021 ............. G06K 7/087

OTHER PUBLICATIONS

International Preliminary Report on Patentability received in related International Patent Application No. PCT/US2024/017642, mailed Sep. 11, 2025 (7 pages).
Extended European Search Report in related EP Application No. 24764521.1, mailed Jul. 1, 2026 (9 pages).

* cited by examiner 500
502
504
504a 504b
510
512
d1

504c
510
d2

510
504c 600
602
604
604a 510
d1
604b
604a 510
d2
604b
604a 510
604b

SYSTEMS AND METHODS FOR USE OF A CONTACTLESS PAYMENT TERMINAL DEVICE

The disclosed technology relates to systems and methods for improving usability of a contactless payment terminal device. Specifically, this disclosed technology relates to providing proximity guide indications to improve the usability of a payment terminal that uses a contactless card reader.

BACKGROUND

Payment terminals commonly now include contactless transaction card readers that allow users to complete a payment transaction by holding their transaction card near the contactless transaction card reader. The contactless transaction card reader can wirelessly obtain payment information (e.g., a credit card number) from the transaction card by wirelessly reading information broadcast by the transaction card via a wireless transmission method (e.g., magnetic strip, radio frequency ID tag, Bluetooth™, or near field communication (NFC)). For this wireless communication to occur, the transaction card must be within a predetermined range of the contactless transaction card reader so that it can adequately obtain the necessary data from the wireless signal of the transaction card. However, due to the varying designs of payment terminals, oftentimes it is not clear to users where the contactless card reader is positioned within the payment terminal and where the user should position their transaction card to achieve adequate communication with the contactless card reader. This can cause the user to have to try positioning their card at multiple locations relative to the payment terminal to attempt to complete a transaction, which can cause delay in completing the transaction and frustration in the user.

Accordingly, there is a need for improved systems and methods for improving usability of a contactless payment terminal device. Embodiments of the present disclosure are directed to this and other considerations.

SUMMARY

Disclosed embodiments may include a system for improving usability of a contactless payment terminal device. The system may include one or more processors, and memory in communication with the one or more processors and storing instructions that, when executed by the one or more processors, are configured to cause the system to improve the usability of a contactless payment terminal device by outputting a proximity guide indication. The system may detect a presence of a contactless transaction card. Responsive to determining that the contactless transaction card is not positioned at a desired location relative to a location of a contactless transaction card reader, the system may output a dynamic proximity guide indication. The dynamic proximity guide indication may be configured to provide a dynamically changing indication of how close the contactless transaction card is to being positioned at the desired location.

Disclosed embodiments may include a system for improving usability of a contactless payment terminal device. The system may include one or more processors, and memory in communication with the one or more processors and storing instructions that, when executed by the one or more processors, are configured to cause the system to improve the usability of a contactless payment terminal device by outputting a proximity guide indication. The system may detect a presence of a contactless transaction card. The system may determine a location of the contactless transaction card relative to a contactless transaction card reader. Responsive to determining that the contactless transaction card is not within a predetermined threshold distance from the contactless transaction card reader, the system may output a proximity guide indication. The proximity guide indication may be configured to provide an indication of a direction that the contactless transaction card should be moved in order to be positioned within the predetermined threshold distance from the contactless transaction card reader.

Disclosed embodiments may include a system for improving usability of a contactless payment terminal device. The system may include one or more processors, and memory in communication with the one or more processors and storing instructions that, when executed by the one or more processors, are configured to cause the system to improve the usability of a contactless payment terminal device by outputting a proximity guide indication. The system may detect that a contactless transaction card is proximate to a contactless transaction card reader. Responsive to determining that the contactless transaction card is not positioned at a desired location relative to a location of a contactless transaction card reader, the system may output a proximity guide indication. The proximity guide indication may be configured to provide a cardholder of the contactless transaction card an indication of where to position the contactless transaction card in relation to a position of the contactless transaction card reader to achieve adequate communication with the contactless payment terminal device.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

5D illustrates an example adequate placement of the contactless transaction card to the contactless payment terminal device.

Figures 5A, 5B, 5C, 5D, 6A, 6B, 6C, 6D:
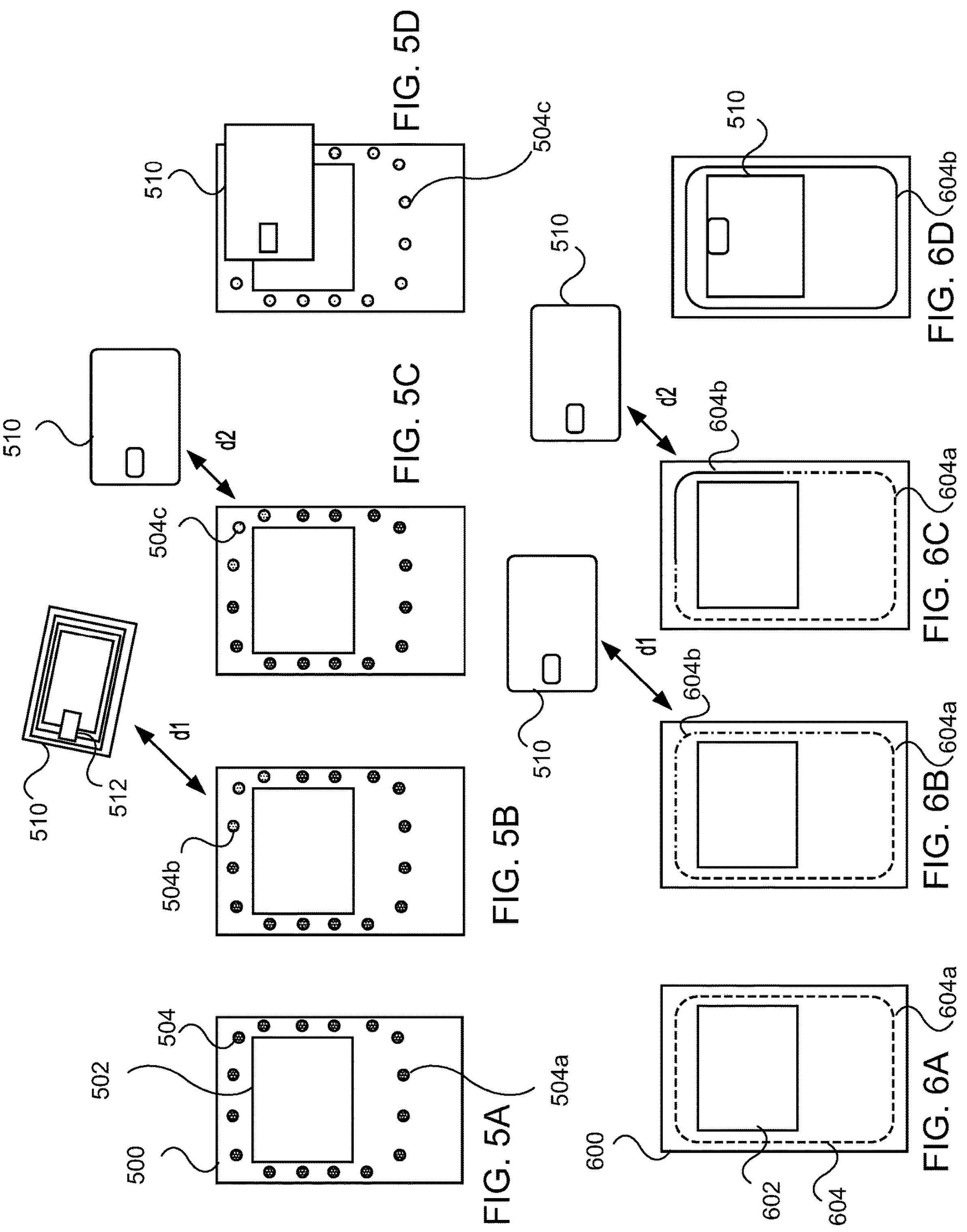
FIG. 5A illustrates an example contactless payment terminal device having a series of LEDs that are used to output a proximity guide indication, according to an example implementation of the disclosed technology.
FIG. 5B illustrates placement of a contactless transaction card proximate to the contactless payment terminal device at a first distance.
FIG. 5C illustrates placement of the contactless transaction card proximate to the contactless payment terminal device at a second distance that is closer than the first distance. FIG.

FIG. 6A illustrates an example contactless payment terminal device having a single continuous LED that is used to output a proximity guide indication, according to an example implementation of the disclosed technology. FIG. 6B illustrates placement of a contactless transaction card proximate to the contactless payment terminal device at a first distance. FIG. 6C illustrates placement of the contactless transaction card proximate to the contactless payment terminal device at a second distance that is closer than the first distance. FIG. 6D illustrates an example adequate placement of the contactless transaction card to the contactless payment terminal device.

Figure 7A:
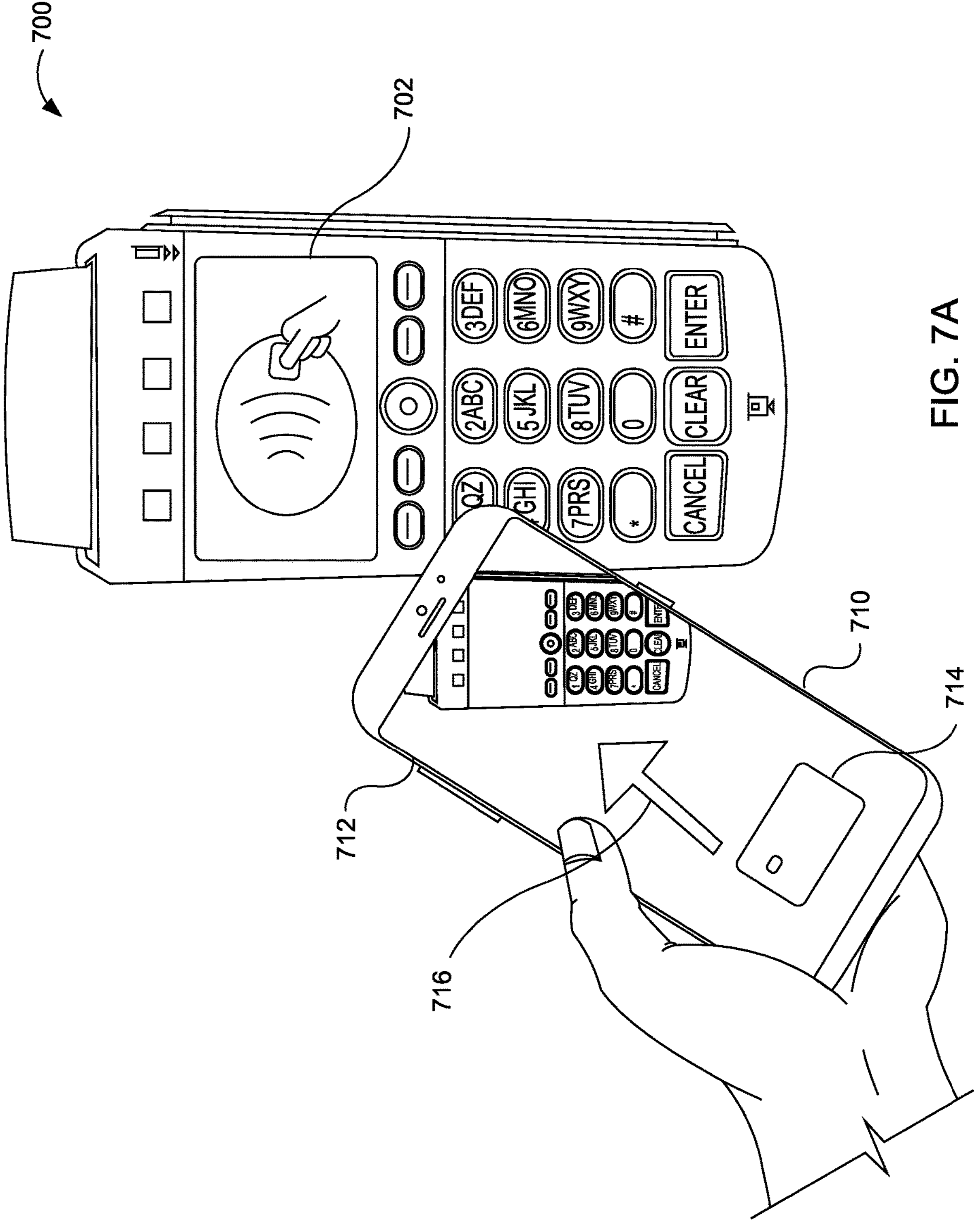
Figure 7B:
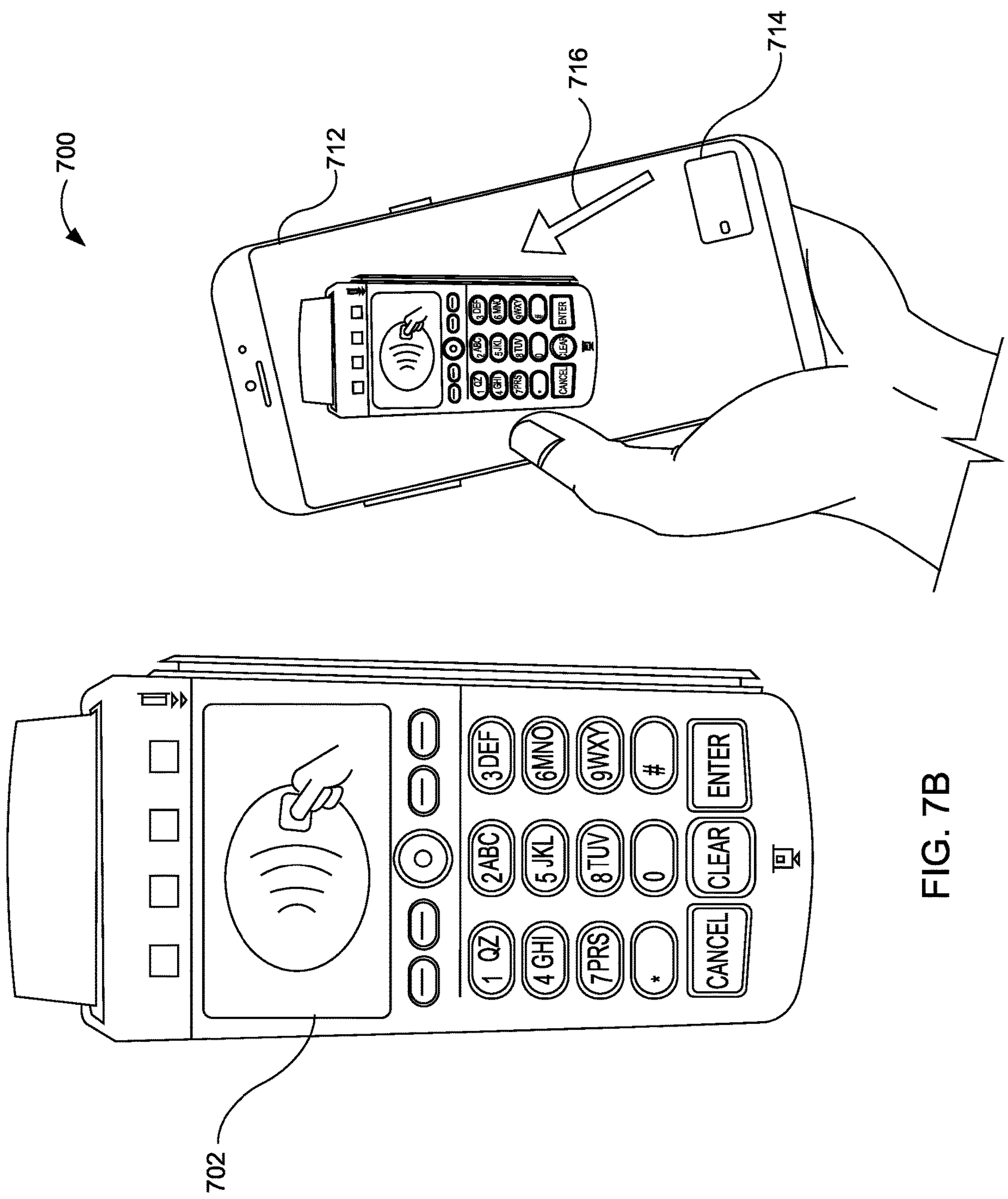

FIG. 7A illustrates an example contactless payment terminal device that interacts with a user device to cause the user device to output a proximity guide indication, according to an example implementation of the disclosed technology. FIG. 7B illustrates placement of the user device at a second location from the contactless payment terminal device that causes the user device to output a second proximity guide indication.

Figure 8A:
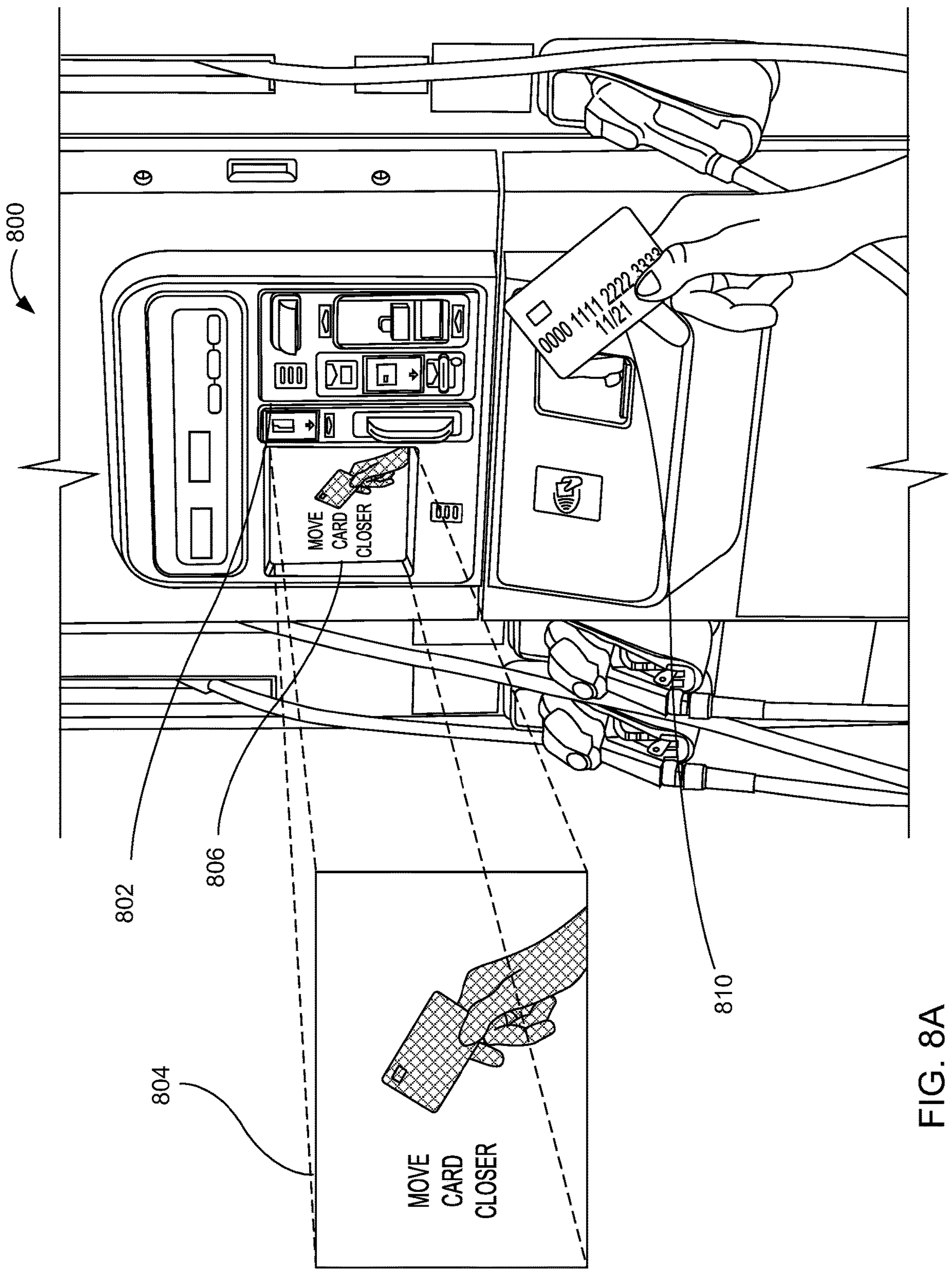
Figure 8B:
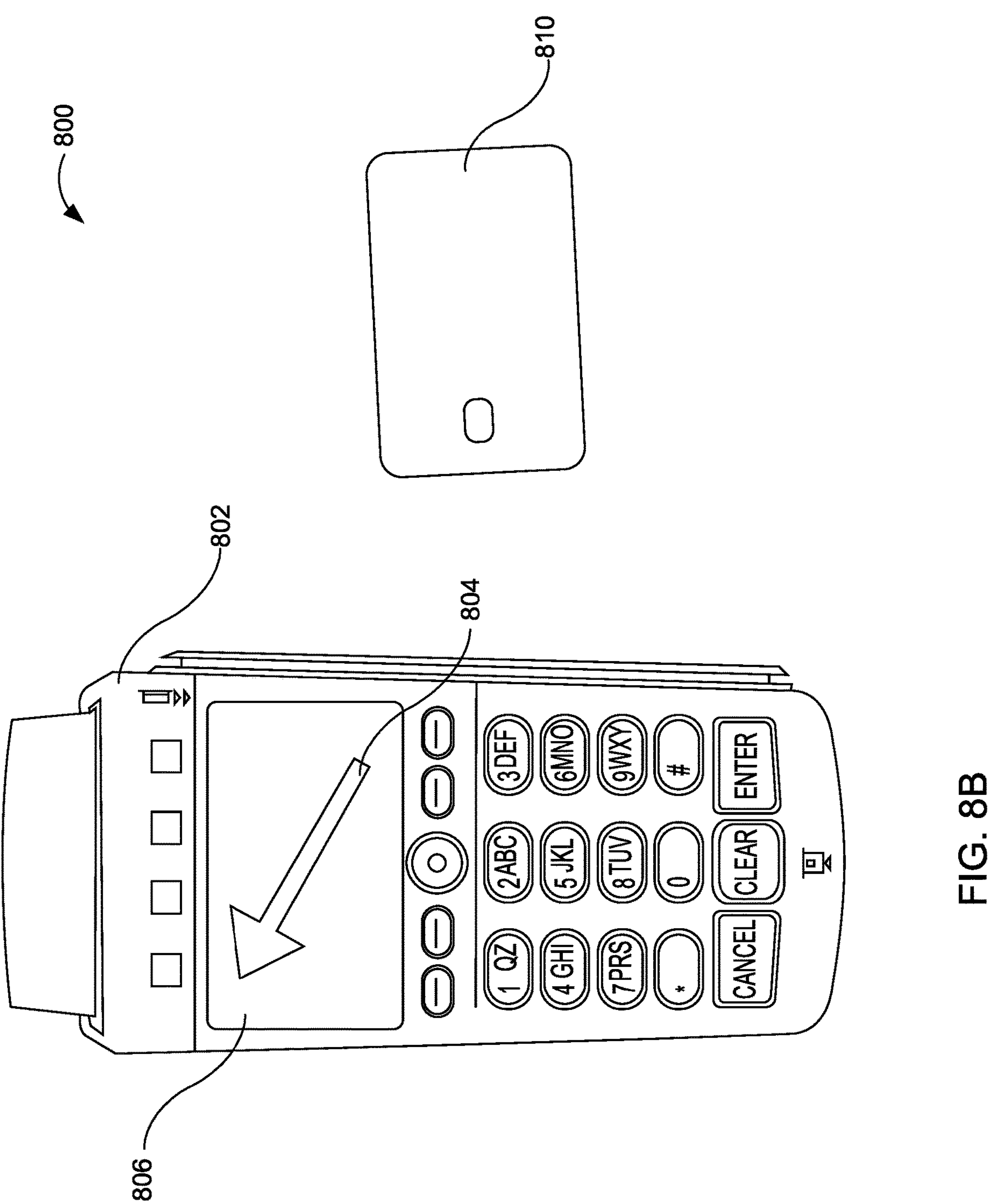

FIG. 8A illustrates an example contactless payment terminal device having a display screen that is used to output a proximity guide indication, according to an example implementation of the disclosed technology. FIG. 8B illustrates placement of a transaction card at a location relative to an example contactless payment terminal device causing the contactless payment terminal device to output a dynamic arrow, according to an example implementation of the disclosed technology.

DETAILED DESCRIPTION

Traditional contactless payment terminal systems include a contactless transaction card reader that is capable of reading a wireless signal from a contactless transaction card, provided that the contactless transaction card is within an adequate distance of the contactless transaction card reader to have a strong enough signal strength to reliably read the wireless signal. The signal may be detectable at a first threshold distance (e.g., 4 cm), however, the transaction card generally needs to be within a second threshold distance (e.g., 2 cm) for a duration long enough for the contactless transaction card reader to receive sufficient payment information (e.g., credit card number) before the system will initiate the transaction. Such systems may include a feedback mechanism, such as a series of LEDs that light up in sequence, to let the user know that the transaction is processing and has completed processing. However, such feedback mechanisms do not address the problem that many users have of trying to locate where to place their card such that the contactless transaction card reader can adequately read the wireless signal of the transaction card in order to initiate the transaction. As such, it is very common for users to fumble around with their transaction card at the payment terminal, moving the card to different locations in an attempt to find a suitable location for the card to be placed in order to initiate a transaction. This problem is compounded by the fact that there are various different payment terminal designs and the contactless transaction card reader can be physically located in a different part of the payment terminal across different payment terminal designs. The inability to quickly and reliably locate where to place a transaction card can lead to user frustration and create delays in executing transactions that decrease the throughput of the payment terminal device.

Accordingly, examples of the present disclosure related to systems and methods for improving usability of a contactless payment terminal device. More particularly, the disclosed technology relates to outputting a proximity guide indication that provides an indication to a user of a transaction card of whether their card is positioned adequately and/or where to move their card to achieve adequate communication with a contactless card reader of a payment terminal to complete a transaction. The systems and methods described herein, in various instances, output proximity guide indications using one or more of light emitting diode (s) (LED(s)), graphical user interface(s), display screen(s) and auditory signals output by audio device(s), which are all necessarily rooted in computers and technology. Further, in various instances, the proximity guide indication is generated in response to the presence of a contactless transaction card that is detected using an electronic receiver configured to detect wireless signals and/or an optical image capture device configured to capture digital images, such techniques are also necessarily rooted in computers and technology. For example, graphical user interfaces are a computer technology that allows for user interaction with computers through touch, pointing devices, or other means. The present disclosure details, in some embodiments, outputting a visual proximity guide indication on a GUI and/or display screen of a payment terminal device and/or mobile device of the user. This, in some examples, may involve using positional data of the contactless transaction card to dynamically change the graphical user interface to provide a user with a near real-time visual indication of whether their transaction card is positioned appropriately and/or where to move their transaction card to achieve communication with a contactless transaction card reader, which involves using, for example, a wireless receiver to track the position (e.g., via signal strength) of the contactless transaction card relative to the contactless transaction card reader. Using a graphical user interface in this way may allow the system to improve the usability of a payment terminal that uses a contactless transaction card reader. This is a clear advantage and improvement over prior technologies that do not provide a user with a proximity guide indication based on the position of their transaction card because those technologies do not provide near real-time assistance to a user in helping them position their transaction card. The present disclosure solves this problem by outputting a proximity guide indication that helps the user position their card via for example, a GUI, and/or a display screen, an auditory tone or one or more LED(s) positioned within the payment terminal. Furthermore, examples of the present disclosure may also improve the speed with which computers can process transactions because by positioning the transaction card at an appropriate location relative to the contactless transaction card reader, the system can achieve optimal data transfer from the transaction card and complete the transaction faster than if the user was repeatedly positioning their transaction card at inadequate locations. Overall, the systems and methods disclosed have significant practical applications in the contactless card transactions field because of the noteworthy improvements of the improved transaction card positioning facilitated by the proximity guide indication output by the system, which are important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
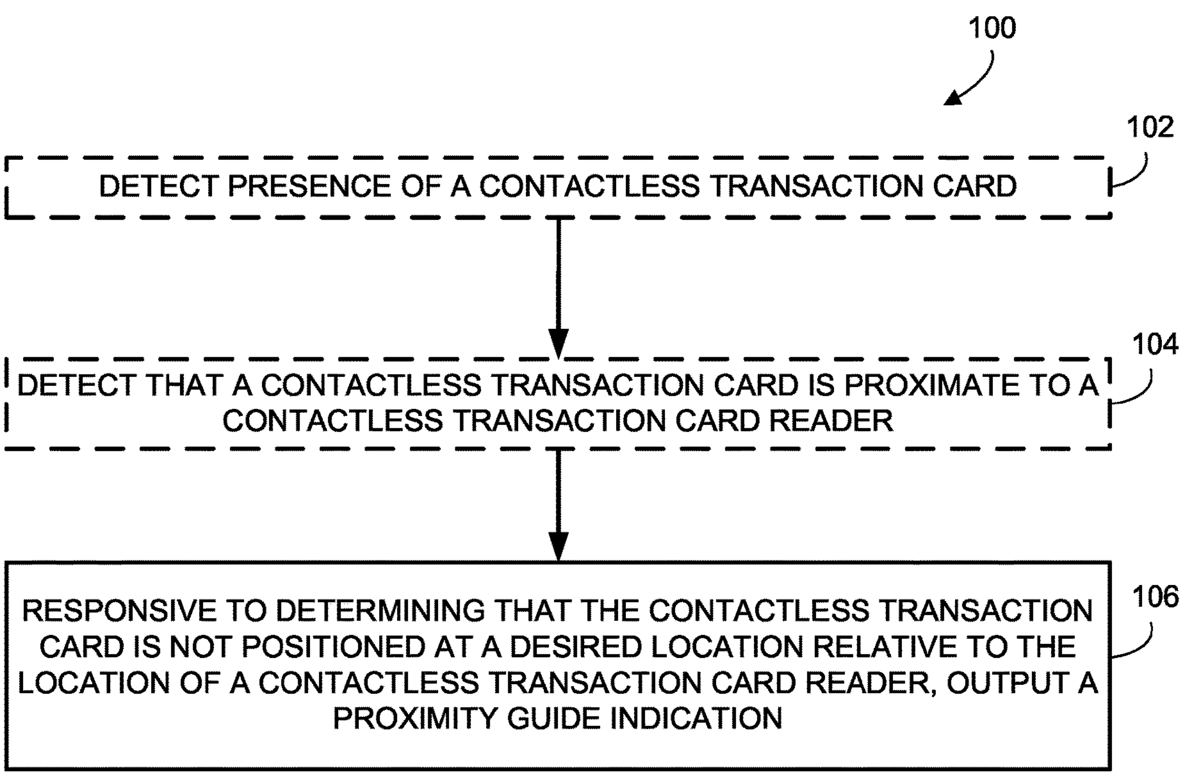
FIG. 1 is a flow diagram illustrating an exemplary method for improving usability of a contactless payment terminal device in accordance with certain embodiments of the disclosed technology.

FIG. 1 is a flow diagram illustrating an exemplary method 100 for improving usability of a contactless payment terminal device, in accordance with certain embodiments of the disclosed technology. The steps of method 100 may be performed by one or more components of the system 400 (e.g., contactless payment terminal device 320, which includes a contactless transaction card reader 380, or user device 402), as described in more detail with respect to FIGS. 3 and 4. FIGS. 5A-5D, 6A-6D, 7 and 8 illustrate example contactless payment terminal devices in accordance with embodiments of the disclosed technology.

In block 102, the contactless payment terminal device 320 may optionally detect a presence of a contactless transaction card. For example, in embodiments, detecting the presence of a contactless transaction card includes detecting a wireless signal emitted by the contactless transaction card. In various embodiments, a contactless transaction card may include magnetic strip, an RFID tag or other wireless signal transmitting components, which transmit or emit a wireless signal. The wireless signal may be a wireless signal output by a wireless transceiver of a mobile device, such as a user device 402. According to some embodiments, the contactless payment terminal device 320 may be configured to detect the presence of a contactless transaction card by applying image recognition techniques to images obtained by a camera associated with the contactless payment terminal device 320 in order to identify the presence of the contactless transaction card in the images. In a case where the contactless transaction card is stored digitally on a user device 402, detecting the presence of the contactless transaction card may include, for example, detecting a wireless signal of the user device 402, visually recognizing the user device 402 in one or more images, and/or determining that the user device 402 has connected to a nearby Wi-Fi network.

In block 104, the contactless payment terminal device 320 may optionally detect that a contactless transaction card is proximate to a contactless transaction card reader 380. According to some embodiments, determining that the contactless transaction card is proximate to the contactless transaction card reader 380 includes detecting a wireless signal output by the contactless transaction card or visually detecting the contactless transaction card in images as described above and determining that the contactless transaction card is within a predetermined threshold distance from the contactless transaction card reader 380.

In block 106, the contactless payment terminal device 320 may output a proximity guide indication in response to determining that the contactless transaction card is not positioned at a desired location relative to a location of a contactless transaction card reader 380.

According to some embodiments, the proximity guide indication is configured to provide a cardholder of the contactless transaction card an indication of where to position the contactless transaction card in relation to a position of the contactless transaction card reader 380 to achieve adequate communication with the contactless payment terminal device. In other words, although the contactless transaction card reader 380 may be able to detect the presence of a contactless transaction card, it may be too far away for the contactless transaction card reader 380 to reliable wirelessly read data from the contactless transaction card, and therefore to achieve that it may be necessary for the contactless transaction card to be moved closer to the contactless transaction card reader 380.

As described herein, proximity guide indications may come in various forms, which may include one or more visual indications, audio indications and haptic indications. For example, in some embodiments, outputting the proximity guide indication includes changing a visual appearance of one or more light emitting diodes associated with the contactless payment terminal device, as described in greater detail below with respect to FIGS. 5A-5D and 6A-6D. In some embodiments, outputting the proximity guide indication includes changing one or more of a frequency, pitch or other characteristic of an auditory signal output by an audio device associated with the contactless payment terminal device. For example, a series of beeps may increase in frequency or a tone may increase in pitch the closer the contactless payment card gets to the contactless payment card reader. According to some embodiments, outputting the proximity guide indication may include causing a display screen associated with one or more of the contactless payment terminal device 320 and a user device 402 to display a directional indication. For example, as explained in greater detail below with respect to FIG. 7A, a display screen of the contactless payment terminal device 320 and/or user device 402 may display an arrow pointing towards the contactless transaction card reader 380 that dynamically changes based on the moving position of the contactless transaction card relative to the contactless transaction card reader 380.

According to some embodiments, the contactless payment terminal device 320 may output an indication of a successful placement of the contactless transaction card in response to determining that the contactless transaction card is positioned at the desired location relative to the location of the contactless transaction card reader 380. For example, if the proximity guide indication involves the use of one or more LEDs, the LEDs may all turn green when the card is positioned adequately relative to the contactless transaction card reader 380. If the proximity guide indication involves use of a display screen, the display screen may provide a visual indication such as presenting a particular image, word(s) or turning a particular color (e.g., green) when the card is positioned adequately relative to the contactless transaction card reader 380. If the proximity guide indication involves use of an audio output, the system may output a chime noise to indicate adequate placement of the card. If the proximity guide indication involves uses of a haptic device (e.g., vibration of user device 402), the system may cause a vibration to stop when the card is adequately placed. It should be understood that it is contemplated that various of these elements can be utilized in different combinations as well. For example, an audio chime may be used to indicate adequate placement in cases where the proximity guide indication was a visual indication, and vice versa (i.e., a visual indication of success may be used where the proximity guide indication is an audio indication).

According to some embodiments, the proximity guide indication may be a dynamic proximity guide indication. A dynamic proximity guide indication may be configured to provide a dynamically changing indication of how close the contactless transaction card is to being positioned at the desired location (i.e., a location that adequately allows the contactless transaction card reader 380 to reliably wirelessly read data from the contactless transaction card). In other words, in some embodiments, the contactless payment terminal device 320 may be continually or intermittently determining estimates of the location and/or distance of the contactless transaction card relative to the contactless transaction card reader 380 and updating the state of the proximity guide indication in near real-time based on the changing location estimates. For example, FIGS. 5A-5D and 6A-6D described in greater detail below provide example embodiments where the contactless payment terminal device 320 includes one or more LEDs that dynamically change based on the location of the contactless transaction card to provide the user with an indication of the adequacy of the card placement and an indication of what direction to move the card to achieve adequate placement. Accordingly, in some embodiments, the contactless payment terminal device 320 may include one or more light emitting diodes and the dynamic proximity guide indication may be a dynamically changing appearance of the one or more light emitting diodes based on a relative position of the contactless transaction card to the contactless transaction card reader 380.

In some embodiments, the contactless payment terminal device 320 may include a display screen and the dynamic proximity guide indication may be one or more colors, images and designs displayed by the display screen that dynamically change based on a relative position of the contactless transaction card to the contactless transaction card reader 380. FIGS. 8A and 8B describe examples of such an embodiment in greater detail below.

According to some embodiments, the contactless payment terminal device 320 includes an audio output device and the dynamic proximity guide indication includes an auditory signal output by the audio output device that dynamically changes based on a relative position of the contactless transaction card to the contactless transaction card reader 380. For example, a tone may change in pitch or a series of beeps may increase or decrease in frequency based on the position of the contactless transaction card relative to the contactless transaction card reader 380.

Thus, as described herein, in various embodiments, a dynamic proximity guide indication may include one or more of a change in visual appearance of one or more light emitting diodes, a change in visual appearance of a display screen, a change in characteristic of an auditory signal output, a change in pitch of an auditory, and a change in a directional display. Further, in various embodiments, the system (i.e., the contactless payment terminal device 320 and/or user device 402) may utilize more than one of these dynamic proximity guide indications in combination. For example, in some embodiments, the contactless payment terminal device 320 may output both a visual and an audio proximity guide indication.

Figure 2:
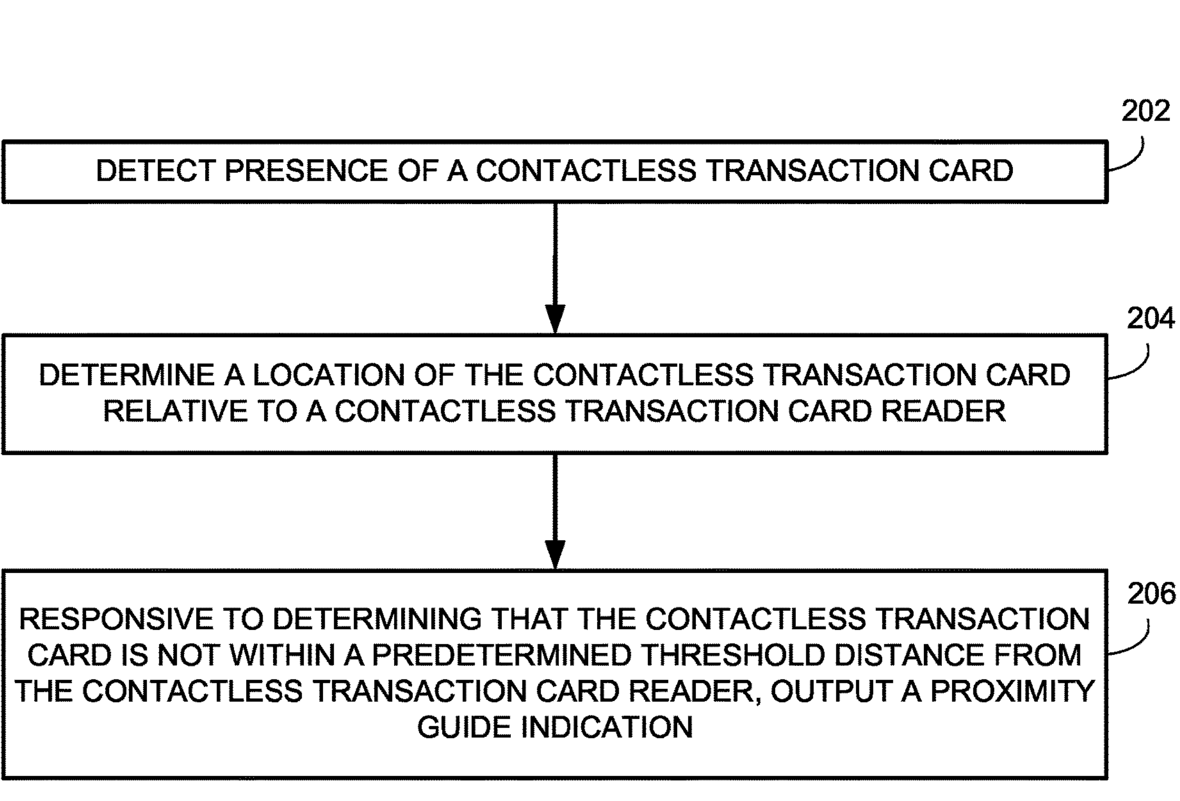
FIG. 2 is a flow diagram illustrating an exemplary method for improving usability of a contactless payment terminal device in accordance with certain embodiments of the disclosed technology.

FIG. 2 is a flow diagram illustrating an exemplary method 200 for improving usability of a contactless payment terminal device, in accordance with certain embodiments of the disclosed technology. The steps of method 200 may be performed by one or more components of the system 400 (e.g., contactless payment terminal device 320 or user device 402), as described in more detail with respect to FIGS. 3 and 4.

In block 202, the contactless payment terminal device 320 may detect a presence of a contactless transaction card by a process similar to that described with respect to block 102 of FIG. 1 previously above.

In block 204, the contactless payment terminal device 320 may determine a location of the contactless transaction card relative to a contactless transaction card reader 380. As described in greater detail below with respect to FIG. 3, the contactless payment terminal device 320 may be configured to calculate or determine an estimated location of the contactless transaction card relative to the contactless transaction card reader 380 based on, for example, a detected wirelessly signal strength of the contactless transaction card and/or images of the contactless transaction card obtained by an optical sensor of the contactless payment terminal device 320. According to some embodiments, the contactless payment terminal device 320 may estimate a physical distance or approximate a physical distance as a function of the wireless signal strength.

In block 206, the contactless payment terminal device 320 may output a proximity guide indication in response to determining that the contactless transaction card is not within a predetermined threshold distance from the contactless transaction card reader 380. In some embodiments, the predetermined threshold distance may be a threshold distance at which the contactless transaction card reader 380 can adequately obtain payment information from the contactless transaction card to complete a transaction.

Generally speaking, the distance at which the contactless transaction card reader can read data from the contactless transaction card is different (and less) than the distance at which the contactless transaction card reader can detect the presence of the contactless transaction card via detecting the existence of a wireless signal. In other words, in some embodiments, the contactless transaction card reader 380 may detect the presence of the contactless transaction card near the contactless transaction card reader 380 when it is within a first threshold distance, however it may not be able to read data from the contactless transaction card until it is within a second, closer threshold distance from the contactless transaction card reader 380. Thus, when the contactless transaction card is positioned between the first and second threshold distances, it is desirable to provide a proximity guide indication to the cardholder to assist them in repositioning the contactless transaction card within the second threshold distance so that the contactless transaction card reader 380 can read data from the contactless transaction card. Thus, according to some embodiments, the proximity guide indication may be configured to provide an indication of a direction that the contactless transaction card should be moved in order to be positioned within the predetermined threshold distance from the contactless transaction card reader 380. The direction may be determined by the contactless payment terminal device 320 by comparing the estimated location of the contactless transaction card (as determined by the contactless payment terminal device 320 as described herein) with the known location of the contactless transaction card reader 380.

According to some embodiments, the proximity guide indication may include one or more of a signal to change an appearance of one or more light emitting diodes associated with the contactless payment terminal device, a signal to change a visual appearance of a display screen of a device and an auditory signal output by a device.

According to some embodiments, determining the location of the contactless transaction card relative to the contactless transaction card reader 380 includes determining a detected signal strength of a wireless signal output by the contactless transaction card. In some embodiments, based on the strength and/or directionality of the wireless signal (or changes thereof), the contactless payment terminal device 320 can estimate a location of the contactless transaction card. For example, in some embodiments, the contactless payment terminal device 320 may use NFC communication, which it may communicate with an antenna located on the transaction card through inductive coupling via magnetic fields between transmit and receive coils. The contactless payment terminal device 320 may be able to tell the relative signal strength at any point in time, which can be used to estimate a relative location of the contactless transaction card. In some embodiments, use of higher power settings and/or a higher quality antenna can result in a greater read range for the contactless payment terminal device 320. According to some embodiments, detecting the presence of a contactless transaction card includes obtaining, via an imaging device, one or more images of the contactless transaction card determining, based on image recognition techniques, that the contactless transaction card is present in the one or more images obtained by the imaging device. The imaging device may be configured to observe an area proximate to the contactless transaction card reader 380. In some embodiments, determining the location of the contactless transaction card relative to the contactless transaction card reader 380 may include determining an approximate distance between the contactless transaction card and the contactless transaction card reader 380 based on the one or more images obtained by the imaging device. As will be appreciated by those of skill in the art, known techniques may be applied to objects in images to estimate distances between them.

Figure 3:
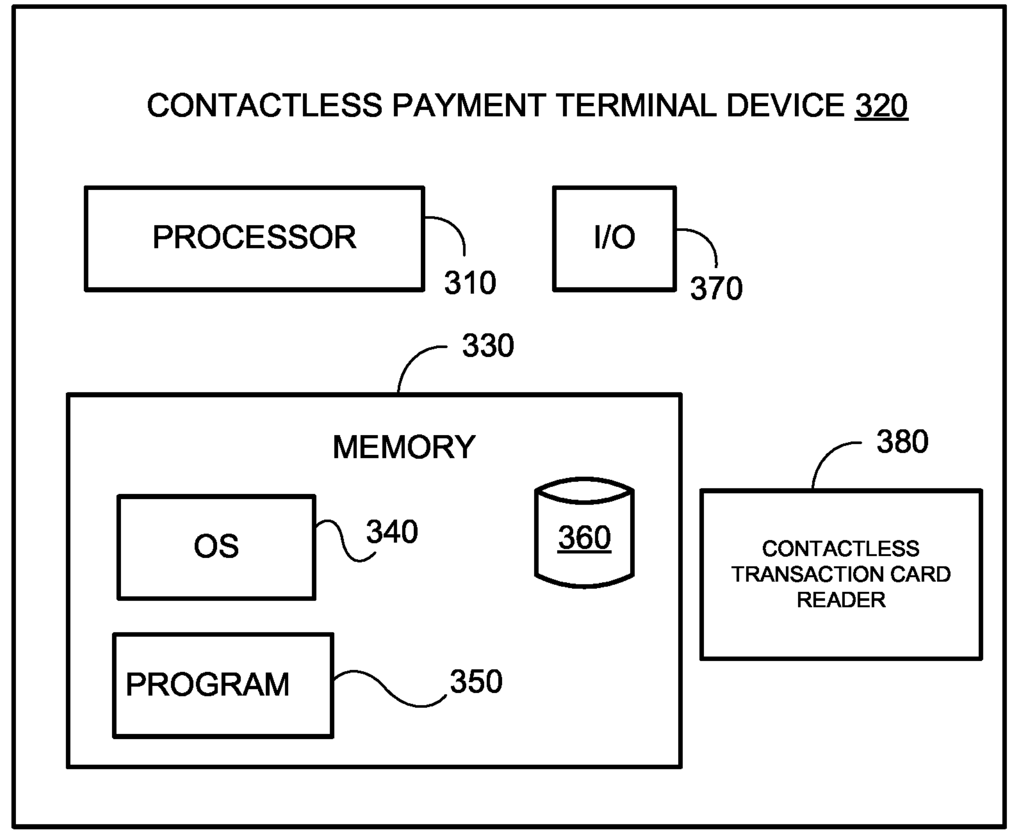
FIG. 3 is block diagram of an example contactless payment terminal device used to provide improving usability of a contactless payment terminal device, according to an example implementation of the disclosed technology.
Figure 4:
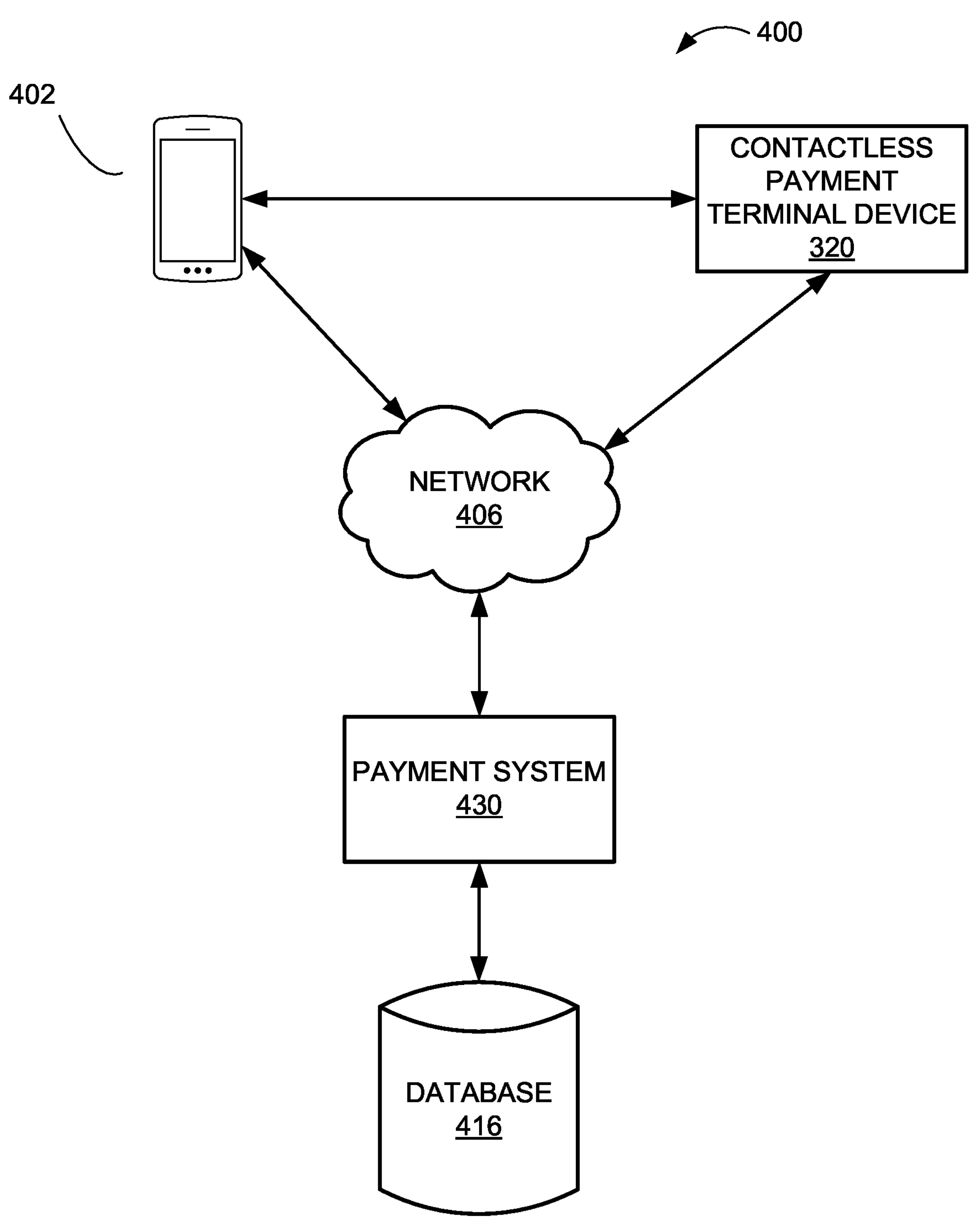
FIG. 4 is block diagram of an example system that may be used to provide improving usability of a contactless payment terminal device, according to an example implementation of the disclosed technology.

FIG. 3 is a block diagram of an example contactless payment terminal device 320 used to receive transaction card data from a contactless transaction card and execute a transaction using the transaction card data according to an example implementation of the disclosed technology. According to some embodiments, the user device 402 and payment system 430, as depicted in FIG. 4 and described below, may have a similar structure and components that are similar to those described with respect to contactless payment terminal device 320 shown in FIG. 3. As shown, the contactless payment terminal device 320 may include a processor 310, an input/output (I/O) device 370 (such as one or more digital cameras and/or LiDAR devices), a contactless transaction card reader 380, and a memory 330 containing an operating system (OS) 340, a program 350 and a database 360. In certain example implementations, the contactless payment terminal device 320 may be a single device or may be configured as a distributed computer system including multiple devices or computers that interoperate to perform one or more of the processes and functionalities associated with the disclosed embodiments. In some embodiments, the contactless payment terminal device 320 may further include a peripheral interface, a transceiver, a mobile network interface in communication with the processor 310, a bus configured to facilitate communication between the various components of the contactless payment terminal device 320, and a power source configured to power one or more components of the contactless payment terminal device 320.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

According to some embodiments, contactless transaction card reader 380 may be configured to wirelessly read from a contactless transaction card for the purposes of executing a transaction using the data. For example, the contactless card reader 308 may include a transceiver to communicate with or at least wirelessly receive data that has been transmit by a contactless transaction card, such as for example, contactless credit card with an RFID chip or a contactless transaction card embodied by user device 402.

A transceiver of the contactless transaction card reader 380 may detect a wireless signal transmit by or emanating from a contactless transaction card when the contactless transaction card is positioned close to the contactless transaction card reader 380. As will be understood by those of skill in the art, in general, the closer the contactless transaction card is positioned relative to the location of the contactless transaction card reader 380, the greater the signal strength detected by the contactless transaction card reader 380 will be. According to some embodiments, the contactless transaction card reader 380 may be configured to detect the presence of a contactless transaction card at a first predetermined distance where, for example, the signal may be very weak but barely detectable, and when the contactless transaction card is positioned at a closer second predetermined distance the contactless transaction card reader 380 may be configured to read data from the contactless transaction card in order to initiation a financial transaction. When the contactless transaction card is positioned at or within this second predetermined distance such that the contactless transaction card reader 380 can initiate the process of reading data transmit by the contactless transaction card, the contactless transaction card may be considered to be positioned at a desired and/or adequate location relative to the contactless transaction card reader 380.

In general, the closer the contactless transaction card is to the contactless transaction card reader 380, the stronger the wireless signal picked up by the transceiver of the contactless transaction card reader 380 will be. Thus, according to some embodiments, the contactless payment terminal device 320 can determine an estimate of a relative distance of the contactless transaction card from the contactless transaction card reader 380 based on the signal strength of the contactless transaction card detected by the contactless transaction card reader 380. Although embodiments of this disclosure refer to determining a distance of the contactless transaction card from the contactless transaction card reader 380, it will be understood that a wireless communication field surrounding the transceiver of the contactless transaction card reader 380 may not be uniform due to various environmental factors (e.g., interference), and as such it will be understood that the term "distance" may refer to a length of physical space between the contactless transaction card and the contactless transaction card reader 380 or it may refer to an approximate length of physical space between the contactless transaction card and the contactless transaction card reader 380 as represented by the strength of the wireless signal of the contactless transaction card that is detected by contactless transaction card reader 380. For example, if a first transaction card and a second transaction card are both 2 cm away from the contactless transaction card reader 380 and have the same signal strengths, then they may be considered to be the same distance away from the contactless transaction card reader 380. However, in some embodiments, if the first and second transaction cards are, for example, 2 cm and 2.5 cm away from the contactless transaction card reader 380 respectively, but the respective signal strengths of each that are detected by the contactless transaction card reader 380 are the same, then they also may be considered to be the same distance away from the contactless transaction card reader 380 because from the perspective of the contactless transaction card reader 380 it appears as though they are the same distance away based on their signal strengths.

According to some embodiments, the contactless payment terminal device 320 may be configured to determine an estimated distance of the contactless transaction card from the contactless transaction card reader 380. For example, in some embodiments, the contactless payment terminal device 320 may be configured to calculate an estimated distance of the contactless transaction card from the contactless transaction card reader 380 based on the magnetic signature strength of the transaction card and/or user device 402. In some embodiments, the contactless transaction card reader 380 may utilize near field communication (NFC) to sense the relative strength of a signal transmit or emanated by the contactless transaction card and/or user device 402, and the contactless payment terminal device 320 may use the detected signal strength to calculate an estimated proximity to the contactless transaction card reader 380. In some embodiments, the contactless payment terminal device 320 may estimate a distance of the contactless transaction card from the contactless transaction card reader 380 based by applying known distance estimation techniques to images that depict the contactless transaction card reader 380. The contactless payment terminal device 320 may apply image recognition techniques to one or more images of the contactless transaction card (and/or user device 402) obtained by an optical sensor (e.g., a digital camera) associated with the contactless payment terminal device 320 to detect the presence of the contactless transaction card in the proximity of the contactless payment terminal device 320 and then estimate the distance between the two based on the images. Furthermore, in some embodiments, the contactless payment terminal device 320 may be associated with one or more light detection and ranging (LiDAR) devices that can be used to target the contactless transaction card and/or user device 402 to determine how far away from the contactless transaction card reader 380 the contactless transaction card is.

When the contactless transaction card is within adequate range of the contactless transaction card reader 380, the contactless transaction card reader 380 may be configured to wirelessly obtain various transaction card data from the contactless transaction card, such for example but not limited to, an account number (e.g., credit/debit card number), an expiration date of the card, a security code of the card, the name of the owner of the card, the name of the financial institution that issued the card, and any other such information as may be common or necessary to obtain for the purposes of executing a transaction. The contactless payment terminal device 320 may transmit such transaction card data along with purchase data (e.g., identification and/or cost of items that a user is attempting to purchase) to payment system 430 for processing of the transaction.

According to some embodiments, the contactless transaction card reader 380 may be configured to establish two-way wireless communication with a user device 402. For example, according to some embodiments, in addition to wirelessly receiving transaction data from a user device 402, the contactless transaction card reader 380 may also be configured to transmit proximity guide indication data to the user device 402 that the user device 402 may use to output a proximity guide indication, for example, as described in greater detail below with respect to FIGS. 7A and 7B.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 310 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 310 may be a single core processor that is configured with virtual processing technologies. In certain embodiments, the processor 310 may use logical processors to simultaneously execute and control multiple processes. The processor 310 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the contactless payment terminal device 320 may include one or more storage devices configured to store information used by the processor 310 (or other components) to perform certain functions related to the disclosed embodiments. In one example, the contactless payment terminal device 320 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The contactless payment terminal device 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the contactless payment terminal device 320 may include the memory 330 that may include one or more programs 350 to perform one or more functions of the disclosed embodiments. For example, in some embodiments, the contactless payment terminal device 320 may additionally manage dialogue and/or other interactions with the customer via a program 350.

The processor 310 may execute one or more programs 350 located remotely from the contactless payment terminal device 320. For example, the contactless payment terminal device 320 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a contactless payment terminal device database 360 for storing related data to enable the contactless payment terminal device 320 to perform one or more of the processes and functionalities associated with the disclosed embodiments. According to some embodiments, the functions provided by the contactless payment terminal device database 360 may also be provided by a database that is external to the contactless payment terminal device 320, such as the database 416 as shown in FIG. 4.

The contactless payment terminal device 320 may also be communicatively connected to one or more memory devices (e.g., databases) locally or through a network. The remote memory devices may be configured to store information and may be accessed and/or managed by the contactless payment terminal device 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The contactless payment terminal device 320 may also include one or more I/O devices 370 that may comprise one or more interfaces for receiving signals or input from devices and providing signals or output to one or more devices that allow data to be received and/or transmitted by the contactless payment terminal device 320. For example, the contactless payment terminal device 320 may include interface components, which may provide interfaces to one or more input devices, such as one or more keyboards, mouse devices, touch screens, track pads, trackballs, scroll wheels, digital cameras, optical sensors, LiDAR sensors, microphones, sensors, and the like, that enable the contactless payment terminal device 320 to receive data from a user (such as, for example, via the user device 402) or otherwise obtain data through sensing, such as image data, sound data, haptic data and other such types of sensor data. In some embodiments, the contactless payment terminal device 320 may include a hologrammatic projection device that is capable of projecting a 3-dimensional image that represents an area within which a contactless transaction card may be placed to be adequately positioned to allow the contactless transaction card reader 380 to read data from the contactless transaction card.

In examples of the disclosed technology, the contactless payment terminal device 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The contactless payment terminal device 320 may contain programs that train, implement, store, receive, retrieve, and/or transmit one or more machine learning models. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, and/or another machine learning model. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The contactless payment terminal device 320 may be configured to adjust model parameters during training. Model parameters may include weights, coefficients, offsets, or the like. Training may be supervised or unsupervised.

The contactless payment terminal device 320 may be configured to train machine learning models by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The contactless payment terminal device 320 may be configured to optimize statistical models using known optimization techniques.

The contactless payment terminal device 320 may include one or more data classification models to classify datasets based on the data schema, statistical profile, and/or edges. A data classification model may include a convolutional neural network, a random forest model, a recurrent neural network model, a support vector machine model, or another machine learning model. A data classification model may be configured to classify data elements as actual data, synthetic data, related data, or any other data category. In some embodiments, contactless payment terminal device 320 is configured to generate and/or train a classification model to classify a dataset, consistent with disclosed embodiments. For example, in some embodiments, the contactless payment terminal device 320 may include one or more machine learning models that are trained to recognize the presence of a contactless transaction card and/or user device 402 in one or more images obtained by the system.

While the contactless payment terminal device 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the contactless payment terminal device 320 may include a greater or lesser number of components than those illustrated.

FIG. 4 is a block diagram of an example system that may be used to receive and process payment information to complete a transaction, according to an example implementation of the disclosed technology. The components and arrangements shown in FIG. 4 are not intended to limit the disclosed embodiments as the components used to implement the disclosed processes and features may vary.

As shown, payment system 430 may interact with a user device 402 and/or contactless payment terminal device 320 via a network 406. In certain example implementations, the payment system 430 may include a database 416.

In some embodiments, a user may possess or otherwise exert physical control of the user device 402. According to some embodiments, the user device 402 can be a contactless transaction card, such as for example, a credit card or debit card capable of wirelessly transmitting transaction card data (e.g., credit card number, security code, owner information, expiration date, etc.). For example, a contactless transaction card may include one or more of a magnetic strip, an RFID tag, a wireless transceiver, an antenna that can be used for NFC communication, or other wireless signal transmitting components capable of transmitting transaction card data.

In some embodiments, the user device 402 can be a mobile device, such as a smartphone, that stores a digital copy of a transaction card (e.g., in a digital wallet). The user device 402 can include one or more of a mobile device, smart phone, general purpose computer, tablet computer, laptop computer, telephone, public switched telephone network (PSTN) landline, smart wearable device, voice command device, other mobile computing device, or any other device capable of communicating with one or more components of the contactless payment terminal device 320 and optionally payment system 430 via the network 406. In some embodiments, user device 402 may be configured to communicate with the contactless payment terminal device 320 using a wireless communication technology such as near field communication, Bluetooth™, Wi-Fi or any other such suitable wireless communication protocol. For example, the user device 402 can wirelessly transmit transaction card data (e.g., credit card number) to contactless payment terminal device 320.

According to some embodiments, the user device 402 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

In some embodiments, the user device 402 may be configured to output a proximity guide indication as directed by contactless payment terminal device 320 in response to wireless communications received from contactless payment terminal device 320. For instance, according in some embodiments the user device 402 may be configured to output a proximity guide indication in the form of one or more images displayed on the display of user device 402, such as an arrow that points in a direction of where the user should move user device 402 in order to be adequately close to the contactless transaction card reader 380 to initiate a transaction. In some embodiments, the display of user device 402 can display an indication of the strength of the signal between the user device 402 and the contactless payment terminal device 320, such as for example, one or more concentric circles that change in number or size based on the signal strength and/or proximity of the user device 402 to the contactless transaction card reader 380. The displayed images may dynamically change based on the movement of the user device 402 (e.g., the direction the arrow points may move based on the repositioning of the user device 402 such that it is always pointing towards the contactless transaction card reader 380).

In some embodiments, user device 402 can be configured to output a proximity guide indication in the form of sounds. For example, user device 402 may output audible instructions such as "move closer," "move left" and the like, to guide the user. Alternatively, user device 402 may output a persistent tone or intermittent beeps that change in pitch, tone and/or frequency in accordance with how close the user device 402 is to the contactless transaction card reader 380. Similarly, in some embodiments, user device 402 can output a proximity guide indication in the form of a vibration generated by a haptic device of user device 402 that changes in terms of strength and/or frequency based on the location of the user device 402 relative to the contactless transaction card reader 380.

The network 406 may be of any suitable type, including individual connections via the internet such as cellular or WiFi networks. In some embodiments, the network 406 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network (VPN) using a public network, and/or other suitable connection(s) that enable(s) components in the system 400 environment to send and receive information between the components of the system 400. The network 406 may also include a PSTN and/or a wireless network.

Payment system 430 may include a computer system configured to execute a transaction based on transaction and/or payment data received from the contactless payment terminal device 320. For example, the contactless payment terminal device 320 may transmit purchase data (e.g., identification of items being purchased and their associated costs) and transaction card data (e.g., credit card number, expiration date, owner name, etc.) to payment system 430 which may then perform backend processing to determine whether to approve or deny the transaction. An approval or denial of the transaction may then be sent by payment system 430 to the contactless payment terminal device 320 to complete a transaction (i.e., either allow or deny the attempted transaction).

Payment system 430 may include or otherwise communicate with a database 416. According to some embodiments, the database 416 may be a database associated with an organization and/or a related entity that stores a variety of information relating to customers, transactions, ATM, and business operations. For example, payment system 430 may access data stored on database 416 when determining whether to approve or deny an attempted transaction based on data received from the contactless payment terminal device 320.

The payment system 430 may be associated with and optionally controlled by one or more entities such as a business, corporation, individual, partnership, or any other entity that provides one or more of goods, services, and consultations to individuals such as customers. In some embodiments, the payment system 430 may be controlled by a third party on behalf of another business, corporation, individual, partnership. The payment system 430 may include one or more servers and computer systems for performing one or more functions associated with products and/or services that the organization provides.

Although the preceding description describes various functions of a contactless payment terminal device 320, a user device 402 and a payment system 430, in some embodiments, some or all of these functions may be carried out by a single computing device.

FIGS. 5A-5D depict an example embodiment of a contactless payment terminal device 500 that is used to obtain transaction card data from a contactless transaction card 510. As shown, the contactless transaction card 510 may include a wireless antenna 512 that transmit transaction card data. The contactless payment terminal device 500 includes a plurality of LEDs 504 that surround the contactless transaction card reader 502. FIG. 5A depicts a first state of the contactless payment terminal device 500 in which there is no contactless transaction card near to the contactless payment terminal device 500. In this state, the plurality of LEDs 504 are in a first state 504*a*, for example, they may output a red light indicating that no contactless transaction card 510 is nearby. In FIG. 5B, someone has placed a contactless transaction card 510 proximate to the contactless transaction card reader 502 at a first distance d1 (e.g., 4 cm), at which the contactless transaction card reader 502 can detect a wireless signal emanating from the contactless transaction card 510, but that is not close enough for the contactless transaction card reader 502 to read data from the card 510.

According to some embodiments, the contactless payment terminal device 500 may be able to determine an approximate distance and/or location of the contactless transaction card 510 based on the signal strength, the directionality of the signal, dynamic changes in the signal strength/directionality as the card moves, and/or visual location of the contactless transaction card 510 using, for example, one or more wireless sensors (e.g., one or more transceivers) and/or optical sensors (e.g., a digital camera and/or LiDAR sensor). For example, in some embodiments, the contactless payment terminal device 500 may include separate antennas in different locations of the contactless payment terminal device 500 and the contactless payment terminal device 500 may be able to determine an approximate location of the wireless transaction card 510 based on the relative signal strengths of the antennas. As will be appreciated by those of skill in the art, multiple wireless signals interacting with an object can be used to determine the location of the object. In this case, based on the determined location of the contactless transaction card 510 relative to the location of the contactless transaction card reader 502, the contactless payment terminal device 500 causes a few of the LEDs 504 to change to a second state 504*b*, such as for example, outputting a yellow light, that indicates that a contactless transaction card 510 is close by. This provides a visual indication to the user that the contactless transaction card 510 is heading towards the contactless transaction card reader 502, but that it still has a way to go because most of the LEDs 504 are still in the first state 504*a*.

As shown in FIG. 5C, when the contactless transaction card 510 is moved to a distance d2 that is closer to the contactless transaction card reader 502 than d1 shown in FIG. 5B, now, based on the location of the contactless transaction card 510 as estimated by the contactless payment terminal device 500, the LED 504 closest to the contactless transaction card 510 is flipped to a third state 504*c* by the contactless payment terminal device 500. The third state 504*c* may indicate that the contactless transaction card 510 has moved even closer to the contactless transaction card reader 502 by outputting, for example, a green light. As the contactless transaction card 510 moves closer to the contactless transaction card reader 502, more LEDs 504 will progressively change to different states based on how far away from the contactless transaction card 510 they are. In this way, the plurality of LEDs 504 provide a dynamic proximity indication that provides a user with an indication of where to move the contactless transaction card 510 to achieve adequate placement with respect to the location of the contactless transaction card reader 502 in order to initiate a data transfer from the contactless transaction card 510 to the contactless transaction card reader 502.

As shown in FIG. 5D, the plurality of LEDs 504 can also provide a visual indication of when the contactless transaction card 510 has achieved adequate placement to initiate the data transfer when all, for example, all of the LEDs 504 have been placed in the third state 504*c* (e.g., all of the LEDs are green). According to some embodiments, adequate placement may occur when the contactless transaction card 510 or a particular portion of the contactless transaction card 510 (e.g., an RFID chip or a portion of a magnetic strip) is within a predetermined distance from the contactless transaction card reader 502. According to some embodiments, the contactless transaction card reader 502 can detect the presence of the contactless transaction card 510 at a first predetermined threshold distance and can wireless read the data of the contactless transaction card 510 at a second threshold distance. In some embodiments, the first threshold distance may be 4 cm and the second threshold distance may be 2 cm, however it will be understood that this is merely an example and different distances may be used based on the type, nature and sensitivity of the sensors, receivers, transmitters, and/or transceivers being used.

FIGS. 6A-6D depict example embodiment of a contactless payment terminal device 600 that used a single continuous LED strip 604 to output a visual proximity guide indication to a holder of a contactless transaction card 510. It may operate in a manner similar to that described above with respect to the contactless payment terminal device 500 of FIGS. 5A-5D, however, instead of lighting up different LEDs 504 based on the location of the contactless transaction card 510 (as determined by the contactless payment terminal device 500), the contactless payment terminal device 600 may change portions of the continuous LED strip 604 in based on the location of the contactless transaction card 510. For example, as shown in FIG. 6A, there is no contactless transaction card 510 near the contactless transaction card reader 602, and so because the contactless transaction card reader 602 does not sense or detect the presence of a contactless transaction card 510 in its vicinity, the contactless payment terminal device 600 may place the entirety of the continuous LED strip 604 in a first state 604*a*. For example, in the first state 604*a*, the entirety of the continuous LED string 604 may output a red color. As shown in FIGS. 6B and 6C, as a contactless transaction card 510 is placed proximate to the contactless transaction card reader 602 and subsequently moved closer to it, the contactless payment terminal device 600 may place ever increasing portions of the continuous LED strip 604 into a second state 604*b* (e.g., lit up green) that indicates the contactless transaction card 510 is closer, until, as shown in FIG. 6D, the entirety of the continuous LED strip 604 is placed in the second state 604*b* by the contactless payment terminal device 600 when the contactless transaction card 510 achieves adequate placement for the contactless transaction card reader 602 to read the contactless transaction card 510. In this way, the contactless payment terminal device 600 may provide a proximity guide indication to a holder of the contactless transaction card 510 in order to help guide the user to place the card at a location where the contactless transaction card reader 602 can adequately read data from it.

FIGS. 7A and 7B depict an example contactless payment terminal device 700 that is configured to communicate with a user device 710 such that the user device 710 outputs a proximity guide indication to the user. In this example, the user device 710 stores a digital contactless transaction card 714, which can be utilized to complete a transaction at the contactless payment terminal device 700 by the user device 710 transmitting the transaction card data associated with the digital contactless transaction card 714 to the contactless transaction card reader 702 of the contactless payment terminal device 700. The contactless payment terminal device 700 may be configured to detect the presence of the digital contactless transaction card 714 based on wireless signals transmit by the user device 710. For example, the wireless signals may be detected by the contactless transaction card reader 702. In some embodiments, the wireless signals may be detected by other means, such as by communication with contactless payment terminal device 700 via a Wi-Fi router. For example, if a user is at a store, the user device 710 may connect to a Wi-Fi network of the store, and the existence of this wireless connection and/or accompanying data such as the existence of the digital contactless transaction card 714 being stored on the user device 710 may be relayed to the contactless payment terminal device 700 such that the contactless payment terminal device 700 may be aware of the presence of the user device 714 in the store, even though the user device 714 may not yet be proximate to the contactless payment terminal device 700 itself. In some embodiments, the contactless payment terminal device 700 may be configured to determine an approximate location of the user device 714 based on global positioning system (GPS) data provided by the user device 710 or wireless signal triangulation methods that may be deployed using multiple wireless base stations or cellular towers around the location of the user device 714. Further, in some embodiments, the contactless payment terminal device 700 may use image recognition techniques on images obtained via one or more optical sensors (e.g., a digital cameras) associated with the contactless payment terminal device 700 to detect the presence of and/or estimate the location of the user device 710 relative to the contactless transaction card reader 702. According to some embodiments, based on the estimated location of the user device 714 relative to the contactless transaction card reader 702, the contactless payment terminal device 700 may transmit proximity guide indication data to the user device 714 (e.g., via Wi-Fi), which the user device 714 may use to output a proximity guide indication (e.g., in the form of arrow 716) to assist the user in guiding the position of the user device 714 towards the contactless transaction card reader 702.

In some embodiments, the user device 714 may be configured to determine its relative location to the contactless transaction card reader 702 of the contactless payment terminal device 700, using, for example image data obtained from a camera of the user device 714. For example, as shown in FIGS. 7A and 7B, a user may point a camera of the user device 714 at the contactless payment terminal device 700 and the user device 714 may display video of what the camera sees. Based on these images, the user device 714 may, using a machine learning model that is trained to recognize where the contactless transaction card reader 702 is located in various types of contactless payment terminal devices, apply image recognition techniques to the images being captured by the user device 714, identify the approximate location of the contactless transaction card reader 702, and then superimpose a visual proximity guide indication, such as an arrow 716, onto the display screen 712 of the user device 714, which points in the direction of the contactless transaction card reader 702. The arrow 716 may dynamically change which direction it points based on the movement and location of the user device 714, such that it is always oriented towards pointing at the contactless transaction card reader 702. For example, in FIG. 7A, the user device 714 is to the left of the contactless transaction card reader 702, and the arrow 716 points to the upper right. As the user device 714 moves relative to the contactless transaction card reader 702, the arrow 716 dynamically changes in direction to continuously point to the contactless transaction card reader 702. Therefore, in an alternative position, such as shown in FIG. 7B, where the user device 714 is to the right of the contactless transaction card reader 702, the arrow 716 points to the upper left. In this way, the system can cause the user device 714 to output a proximity guide indication to help guide the user to place the user device 714 in a location that allows for adequate communication of the contactless digital transaction card data to the contactless transaction card reader 702. It will be appreciated that while the user device 714 may be capable of communicating with the contactless payment terminal device 700 at a greater distance using, for example, a Wi-Fi connection, while it may be possible to also communicate the digital contactless transaction card data to the contactless payment terminal device 700 via Wi-Fi, that may present security risks and thus may not be desirable. Thus, even though a user device 714 may be capable of communicating wirelessly at great distances with the contactless payment terminal device 700, for security purposes the system may nonetheless restrict communication of transaction card data to certain close range methods such as by magnetic strip, radio frequency ID tag, Bluetooth™, or near field communication (NFC). In some embodiments, the user device 714 can be configured to output additional and/or alternative types of proximity guide indications, such as audio outputs (e.g., verbal instructions, beeps, tones), vibrations, and other types of visual indications (e.g., highlighting the contactless transaction card reader 702 on the display screen 712) that provide indications of how close the user device 714 is to the contactless transaction card reader 702 and what direction the user device 714 should be moved in so that it is closer to the contactless transaction card reader 702.

FIG. 8A depicts an example contactless payment terminal device 800 that is configured to detect the presence of a contactless transaction card 810 and output a proximity guide indication in the form of a visual proximity guide indication 804 displayed on a display screen of the contactless payment terminal device 800 in order to help guide a user to place the contactless transaction card 810 at a desired location relative to the contactless transaction card reader 802. According to some embodiments, the contactless payment terminal device 800 may include one or more digital video cameras for obtaining images of the contactless transaction card 810 in the proximity of the contactless payment terminal device 800. In some embodiments, the contactless payment terminal device 800 may utilize or more machine learning models that have been trained to perform image recognition to recognize the presence of a contactless transaction card to detect the presence of the card and approximate its location. The contactless payment terminal device 800 can then determine a direction that the contactless transaction card 810 should be moved in order to be positioned adequately relative to the contactless transaction card reader 802 and then generate a proximity guide indication that represents this information. For example, the payment terminal device 800 may include a display screen 806 that displays a visual proximity guide indication 804 that may, for example provide directions indicating where to move the card. In some embodiments, the display screen 806 may display a real-time image of the user's hand with the transaction card (as obtained by a camera of the payment terminal device 800) and may superimpose a visual proximity guide indication on it, such as for example, an arrow next to the user's hand indicating a direction that the user should move their hand to be closer to the contactless transaction card reader 802.

FIG. 8B depicts an alternative embodiment of an example contactless payment terminal device 800 that is configured to detect the presence of a contactless transaction card 810 and output a proximity guide indication. In FIG. 8B, the contactless payment terminal device 800 outputs a proximity guide indication 804 in the form of a dynamic arrow on display screen 806. The dynamic arrow may change in position on display screen 806 or rotate relative to the movement of the transaction card 810. The dynamic arrow may grow, stretch, or shrink to indicate a distance of the transaction card 810 to contactless card reader 802. The user may therefore view the dynamic arrow and interpret how they need to move transaction card 810 in order to complete the transaction with contactless card reader 802. For example, if the user's transaction card 810 is to the bottom right of the contactless card reader 802, the dynamic arrow may be positioned to point to the upper left of the display screen 806. If the user's transaction card 810 is to the upper right of the contactless card reader 802, the dynamic arrow may be positioned to point to the lower left of display screen 806. If the user moves the transaction card 810 further away from the contactless card reader 802, the dynamic arrow may stretch or become thinner in shape.

The contactless payment terminal devices 500, 600, 700, 800 of FIGS. 5A-8B described above may include some or all of the features of the contactless payment terminal device 320 described above with respect to FIG. 3. Similarly, the contactless transaction card readers 502, 602, 702, 802 referenced in FIGS. 5A-8B may include some or all of the features of the contactless transaction card reader 380 described above with respect to FIG. 3. User device 710 depicted in FIGS. 7A and 7B may include some or all of the features of user device 402 described previously above. It should be understood that all of the embodiments shown in these figures are merely examples, and it is contemplated that different configurations, combinations and variations of elements described herein are contemplated. For example, although FIGS. 5A-5D and FIGS. 6A-6D refer to the use of three and two LED states, respectively, these are merely examples and it is contemplated that any variety of states and/or numbers, configurations and combinations of LEDs can be used according to varying embodiments. For example, in one embodiment, a straight line of LEDs disposed across the top of a contactless payment terminal device may light up or change color in sequence based on how close or far away the contactless transaction card 510 is to a contactless transaction card reader. Further, it is contemplated that various combinations of one or more of the various proximity guide indications (e.g., various visual, audio and haptic proximity guide indications) discussed herein may be utilized in various embodiments.

Example Use Case

The following example use case describes an example of a typical user flow pattern. This section is intended solely for explanatory purposes and not in limitation.

In one example, John Doe may visit a food court to purchase lunch. The food court may be set up such that a user manually inputs their food order on a screen of a payment kiosk to be paid for then picked up at a food station. John may input his food order on a touchscreen of the payment kiosk and then select and option to pay by credit card at a contactless payment terminal. John takes a credit card out of his wallet and then proceeds to extend his hand towards the contactless payment terminal, holding the credit card out with the intent of wirelessly connecting it to a contactless card reader of the contactless payment terminal. However, while John knows where the contactless payment terminal is, he is unsure exactly where within the terminal the contactless card reader is located, and thus is unsure where to precisely position his card so that it can adequately communicate his card information to the contactless transaction card reader. However, once his card is close enough to the card reader that it can detect the card's presence (e.g., via contactless transaction card reader 380 detecting a wireless signal of the card or a video camera of contactless payment terminal device visually detecting the card), the system may output one or more proximity guide indications to aid John in where he should position his card in order to initiate the transaction. For example, the contactless payment terminal may have one or more LEDs that surround the physical location of the contactless transaction card reader that progressively change colors (e.g., from red, to yellow, to green) the closer John's credit card gets to being adequately positioned relative to the contactless transaction card reader, thus providing John with a visual indication of whether is card is adequately placed to initiate the transaction, and if not, providing an indication of which direction he should move the card in order to be adequately placed. The contactless payment terminal may also include a display screen that may, for example, display an arrow that dynamically changes direction based on the location of John's card relative to the location of the contactless transaction card reader such that it is always pointing the card towards the location of contactless transaction card reader. The contactless payment terminal may be configured to output an audio proximity guide indication in the form of verbal instructions (e.g., "move card left"), or a tone or series of beeps that change in pitch/frequency based on how close the card is to that contactless transaction card reader (e.g., the closer the card gets to the contactless transaction card reader the more frequent the beeps are or the higher the pitch the tone is) and that provide a different noise (e.g., a chime noise) to indicate the card has successfully been positioned relative to the contactless transaction card reader in order to adequately initiate a data transfer from the card to the contactless transaction card reader. The proximity guide indications may dynamically change based on the changing location and/or signal strength of the contactless transaction card as detected or determined by the contactless payment terminal device and contactless transaction card reader.

In another example, instead of a typical credit card, John may instead have a digital version of his credit card stored in a digital wallet on his smartphone (e.g., user device 402) that he may use to pay. In this case, John may put his smartphone in his hand and reach it towards the contactless payment terminal in a manner similar to that described above with respect to the credit card and the contactless payment terminal may output one or more proximity guide indications as described above. However, in this instance, the system may be configured to communicate a proximity guide indication to be output by the smartphone. For example, the smartphone may similarly output and audio indication (e.g., beeps) or a visual indication (e.g., an arrow pointing in the direction of the contactless transaction card reader) that dynamically change as the smartphone is repositioned relative to the contactless transaction card reader. In this way, the system can generate visual, audio and/or haptic indications that help guide a user's attempt to adequately place a contactless transaction card relative to a contactless transaction card reader in order to initiate a data transfer of transaction card information to the payment terminal.

In some examples, disclosed systems or methods may involve one or more of the following clauses:

Clause 1: A system for improving usability of a contactless payment terminal device comprising: one or more processors; and a memory in communication with the one or more processors and storing instructions that, when executed by the one or more processors, are configured to cause the system to: detect a presence of a contactless transaction card; and responsive to determining that the contactless transaction card is not positioned at a desired location relative to a location of a contactless transaction card reader, output a dynamic proximity guide indication wherein the dynamic proximity guide indication is configured to provide a dynamically changing indication of how close the contactless transaction card is to being positioned at the desired location.

Clause 2: The system of clause 1, wherein detecting the presence of a contactless transaction card comprises detecting a wireless signal emitted by the contactless transaction card.

Clause 3: The system of clause 1, wherein the contactless transaction card comprises one of: a transaction card comprising a magnetic strip, an RFID tag or other wireless signal transmitting components; or a mobile device comprising a wireless transceiver.

Clause 4: The system of clause 1, wherein the contactless payment terminal device comprises one or more light emitting diodes and the dynamic proximity guide indication comprises a dynamically changing appearance of the one or more light emitting diodes based on a relative position of the contactless transaction card to the contactless transaction card reader.

Clause 5: The system of clause 1, wherein the contactless payment terminal device comprises a display screen and the dynamic proximity guide indication comprises one or more colors, images and designs displayed by the display screen that dynamically change based on a relative position of the contactless transaction card to the contactless transaction card reader.

Clause 6: The system of clause 1, wherein the contactless payment terminal device comprises an audio output device and the dynamic proximity guide indication comprises an auditory signal output by the audio output device that dynamically changes based on a relative position of the contactless transaction card to the contactless transaction card reader.

Clause 7: The system of clause 1, wherein the dynamic proximity guide indication comprises one or more of: a change in visual appearance of one or more light emitting diodes; a change in visual appearance of a display screen; a change in characteristic of an auditory signal output; a change in pitch of an auditory; and a change in a directional display Clause 8: A system for improving usability of a contactless payment terminal device comprising: one or more processors; and a memory in communication with the one or more processors and storing instructions that, when executed by the one or more processors, are configured to cause the system to: detect a presence of a contactless transaction card; determine a location of the contactless transaction card relative to a contactless transaction card reader; and responsive to determining that the contactless transaction card is not within a predetermined threshold distance from the contactless transaction card reader, output a proximity guide indication, wherein the proximity guide indication is configured to provide an indication of a direction that the contactless transaction card should be moved in order to be positioned within the predetermined threshold distance from the contactless transaction card reader.

Clause 9: The system of clause 8, wherein the proximity guide indication comprises one or more of: a signal to change an appearance of one or more light emitting diodes associated with the contactless payment terminal device; a signal to change a visual appearance of a display screen of a device; and an auditory signal output by a device.

Clause 10: The system of clause 8, wherein determining the location of the contactless transaction card relative to the contactless transaction card reader comprises determining a detected signal strength of a wireless signal output by the contactless transaction card Clause 11: The system of clause 8, wherein detecting the presence of a contactless transaction card comprises: obtaining, via an imaging device, one or more images of the contactless transaction card, wherein the imaging device is configured to observe an area proximate to the contactless transaction card reader; and determining, based on image recognition techniques, that the contactless transaction card is present in the one or more images obtained by the imaging device Clause 12: The system of clause 11, wherein determining the location of the contactless transaction card relative to the contactless transaction card reader comprises determining an approximate distance between the contactless transaction card and the contactless transaction card reader based on the one or more images obtained by the imaging device.

Clause 13: The system of clause 8, wherein the predetermined threshold distance comprises a threshold distance at which the contactless transaction card reader can adequately obtain payment information from the contactless transaction card to complete a transaction.

Clause 14: A system for improving usability of a contactless payment terminal device, comprising: one or more processors; and memory in communication with the one or more processors and storing instructions that, when executed by the one or more processors, are configured to cause the system to: detect that a contactless transaction card is proximate to a contactless transaction card reader; and responsive to determining that the contactless transaction card is not positioned at a desired location relative to a location of a contactless transaction card reader, output a proximity guide indication, wherein the proximity guide indication is configured to provide a cardholder of the contactless transaction card an indication of where to position the contactless transaction card in relation to a position of the contactless transaction card reader to achieve adequate communication with the contactless payment terminal device.

Clause 15: The system of clause 14, wherein determining that the contactless transaction card is proximate to the contactless transaction card reader comprises detecting a wireless signal output by the contactless transaction card.

Clause 16: The system of clause 14, wherein determining that the contactless transaction card is not positioned at a desired location relative to the location of a contactless transaction card reader comprises determining that the contactless transaction card is not positioned within a predetermined threshold distance from the contactless transaction card reader.

Clause 17: The system of clause 14, wherein outputting the proximity guide indication comprises changing a visual appearance of one or more light emitting diodes associated with the contactless payment terminal device.

Clause 18: The system of clause 14, wherein outputting the proximity guide indication comprises changing one or more of a frequency, pitch or other characteristic of an auditory signal output by an audio device associated with the contactless payment terminal device.

Clause 19: The system of clause 14, wherein outputting the proximity guide indication comprises causing a display screen associated with one or more of the contactless payment terminal device and a user device to display a directional indication.

Clause 20: The system of clause 14, further comprising responsive to determining that the contactless transaction card is positioned at the desired location relative to the location of the contactless transaction card reader, output an indication of a successful placement of the contactless transaction card.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for improving usability of a contactless payment terminal device comprising:

a sensor comprising an optical sensor;

a plurality of light emitting diodes (LEDs) positioned around a contactless transaction card reader of the contactless payment terminal device;

one or more processors; and a memory in communication with the one or more processors and storing instructions that, when executed by the one or more processors, are configured to cause the system to:

detect a presence of a contactless transaction card by performing one or more actions comprising obtaining one or more images from the optical sensor; and responsive to determining that the contactless transaction card is not positioned at a desired location relative to a location of the contactless transaction card reader, output a dynamic proximity guide indication, wherein the dynamic proximity guide indication is configured to provide a dynamically changing indication of a direction to move the contactless transaction card in to achieve placement of the contactless transaction card at the desired location by one or more subsets of the plurality of LEDs dynamically changing between a plurality of states based on a current position of the contactless transaction card relative to each of the plurality of LEDs.

2. The system of claim 1, wherein the sensor further comprises a transceiver and the one or more actions further comprise detecting a wireless signal emitted by the contactless transaction card via the transceiver.

3. The system of claim 1, wherein the contactless transaction card comprises one of:

a transaction card comprising a magnetic strip, an RFID tag or other wireless signal transmitting components; or a mobile device comprising a wireless transceiver.

4. The system of claim 1, wherein the contactless payment terminal device comprises a display screen and the dynamic proximity guide indication comprises one or more colors, images and designs displayed by the display screen that dynamically change based on a relative position of the contactless transaction card to the contactless transaction card reader.

5. The system of claim 1, wherein the contactless payment terminal device comprises an audio output device and the dynamic proximity guide indication comprises an auditory signal output by the audio output device that dynamically changes based on a relative position of the contactless transaction card to the contactless transaction card reader.

6. The system of claim 1, wherein the dynamic proximity guide indication comprises one or more of:

a change in visual appearance of one or more of the plurality of LEDs;

a change in visual appearance of a display screen;

a change in characteristic of an auditory signal output;

a change in pitch of an auditory; and a change in a directional display.

7. A system for improving usability of a contactless payment terminal device comprising:

a sensor comprising an imaging device;

a plurality of light emitting diodes (LEDs) positioned around a contactless transaction card reader of the contactless payment terminal device;

one or more processors; and a memory in communication with the one or more processors and storing instructions that, when executed by the one or more processors, are configured to cause the system to:

detect, by the sensor based on one or more images of the contactless transaction card obtained by the imaging device, a presence of a contactless transaction card;

determine a location of the contactless transaction card relative to the contactless transaction card reader by applying image recognition techniques to the one or more images of the contactless transaction card obtained by the imaging device to estimate a distance between the contactless transaction card and the contactless transaction card reader; and responsive to determining that the contactless transaction card is not within a predetermined threshold distance from the contactless transaction card reader, output a proximity guide indication, wherein the proximity guide indication is configured to provide an indication of a direction that the contactless transaction card should be moved in order to be positioned within the predetermined threshold distance from the contactless transaction card reader by one or more subsets of the plurality of LEDs dynamically changing between a plurality of states based on a current position of the contactless transaction card relative to each of the plurality of LEDS.

8. The system of claim 7, wherein the proximity guide indication comprises one or more of:

a signal to change an appearance of one or more of the plurality of LEDs;

a signal to change a visual appearance of a display screen of a device; and an auditory signal output by a device.

9. The system of claim 7, wherein determining the location of the contactless transaction card relative to the contactless transaction card reader further comprises determining a detected signal strength of a wireless signal output by the contactless transaction card.

10. The system of claim 7, wherein the imaging device is configured to observe an area proximate to the contactless transaction card reader and detecting the presence of a contactless transaction card comprises:

obtaining, via the imaging device, the one or more images of the contactless transaction card; and determining, based on image recognition techniques, that the contactless transaction card is present in the one or more images obtained by the imaging device.

11. The system of claim 7, wherein outputting the proximity guide indication comprises changing one or more of a frequency, pitch or other characteristic of an auditory signal output by an audio device associated with the contactless payment terminal device.

12. A system for improving usability of a contactless payment terminal device, comprising:

a sensor comprising at least an optical sensor;

a plurality of light emitting diodes (LEDs) positioned around a contactless transaction card reader of the contactless payment terminal device;

one or more processors; and memory in communication with the one or more processors and storing instructions that, when executed by the one or more processors, are configured to cause the system to:

detect, by the sensor based on one or more images obtained by the optical sensor, that a contactless transaction card is proximate to a contactless transaction card reader by applying image recognition techniques to the one or more images obtained by the optical sensor to estimate a distance between the contactless transaction card and the contactless transaction card reader; and responsive to determining that the contactless transaction card is not positioned at a desired location relative to a location of the contactless transaction card reader, output a proximity guide indication, wherein the proximity guide indication is configured to provide a cardholder of the contactless transaction card an indication of where to position the contactless transaction card in relation to a position of the contactless transaction card reader to achieve adequate communication with the contactless payment terminal device by one or more subsets of the plurality of LEDs dynamically changing between a plurality of states based on a current position of the contactless transaction card relative to each of the plurality of LEDs.

13. The system of claim 12, wherein detecting that the contactless transaction card is proximate to the contactless transaction card reader further comprises detecting a wireless signal output by the contactless transaction card.

14. The system of claim 12, wherein determining that the contactless transaction card is not positioned at a desired location relative to the location of a contactless transaction card reader comprises determining that the contactless transaction card is not positioned within a predetermined threshold distance from the contactless transaction card reader.

15. The system of claim 12, wherein outputting the proximity guide indication comprises changing a visual appearance of one or more of the plurality of LEDs.

16. The system of claim 12, wherein outputting the proximity guide indication comprises causing a display screen associated with one or more of the contactless payment terminal device and a user device to display a directional indication.

17. The system of claim 12, further comprising responsive to determining that the contactless transaction card is positioned at the desired location relative to the location of the contactless transaction card reader, output an indication of a successful placement of the contactless transaction card.

18. The system of claim 1, wherein the sensor further comprises one or more wireless transceivers that are configured to detect one or more signal strengths of the contactless transaction card.

19. The system of claim 1, wherein the plurality of states comprises more than two states.

20. The system of claim 1, wherein the plurality of LEDs positioned around the contactless transaction card reader are positioned to surround the contactless transaction card reader.

* * * * *